(12) United States Patent
Kay (10) Patent No.: US 6,193,607 B1
(45) Date of Patent: Feb. 27, 2001

(54) RANDOM NUMBER GENERATOR FOR ELECTRONIC APPLICATIONS

(75) Inventor: Timothy L. Kay, Los Altos, CA (US)

(73) Assignee: Silicon Gaming, Inc., Palo Alto, CA (US)

( * ) Notice: Subject to any disclaimer, the term of this patent is extended or adjusted under 35 U.S.C. 154(b) by 0 days.

(21) Appl. No.: 08/853,805

(22) Filed: May 9, 1997

Related U.S. Application Data (63) Continuation-in-part of application No. 08/665,699, filed on Jun. 18, 1996, now Pat. No. 5,871,400.

(51) Int. Cl.[7] ................................. A63F 9/21; G06F 1/02
(52) U.S. Cl. ........................................... 463/22; 708/250
(58) Field of Search ........................ 364/717.01, 717.03, 364/717.05; 463/22; 708/250, 251, 252, 255, 256

(56) References Cited

U.S. PATENT DOCUMENTS

| | | | |
|---|---|---|---|
| 4,499,551 | * | 2/1985 | Frank ............................... 364/717.01 |
| 4,791,594 | * | 12/1988 | Harney et al. .................. 364/717.03 |
| 5,251,165 | * | 10/1993 | James, III ....................... 364/717.01 |
| 5,317,528 | * | 5/1994 | Gofman ........................... 364/717.01 |
| 5,588,649 | * | 12/1996 | Blumberg et al. ..................... 463/18 |
| 5,588,913 | * | 12/1996 | Hecht .................................. 273/237 |
| 5,602,845 | * | 2/1997 | Wahl .............................. 364/717.01 |
| 5,871,400 | * | 2/1999 | Yfantis ................................. 463/22 |
| 5,873,781 | * | 2/1999 | Keane .................................. 463/22 |

* cited by examiner

Primary Examiner—Jessica J. Harrison
(74) Attorney, Agent, or Firm—Claude A. S. Hamrick; Oppenheimer W. Donnelly (57) ABSTRACT

A method and apparatus for generating random numbers for use in electronic applications is disclosed. A given sequence of random binary numbers of a certain length can be decoded into several random numbers for a specific application. The upper range values of the random numbers to be decoded determine the number of bits required for the generation of the these random numbers. In the decoding process, the given random binary number divides a range value to generate a remainder and a quotient. The quotient becomes the new random binary number for the generation of other random numbers while the remainder is the generated random number. The process then repeats to generate other random numbers. At the end of the generation process, the last quotient determines the validity of the generated random numbers.

27 Claims, 8 Drawing Sheets

RANDOM NUMBER GENERATOR FOR ELECTRONIC APPLICATIONS

SPECIFICATION

This application is a Continuation-in-Part of application Ser. No. 08/665,699, filed Jun. 18, 1996, entitled "Random Number Generator for Electronic Applications, now U.S. Pat. No. 5,871,400.

BACKGROUND OF THE INVENTION

1. Field of the Invention

The present invention generally relates to random number generators for electronic applications, and more specifically, to an improved random number generator for electronic game applications where the random numbers generated are further decoded using a novel method.

2. Description of the Prior Art

Many electronic devices require random number generators. In particular, in games of chance such as poker, roulette, and slot machines, randomness is critically important to ensure proper payment of winnings.

In considering a random number generator, there are several important and desirable characteristics. First, every possible permutation in the designated range of numbers must be obtainable. Second, the probability of a permutation appearing is the same as the probability of any other permutation. Thirdly, the occurrence of a permutation does not favor or disfavor the occurrence of any other permutation. Fourthly, it is desirable that the random number generator generates random permutations having a large period before it recycles. Lastly, it is desirable that the random number generator uses minimal hardware and has fast execution speed.

Random number generators of the prior art do not always have these desirable characteristics. In fact, many prior art generators do not provide every possible permutation in the designated range of numbers with equal probability, while other generators may require extensive computational hardware to carry out complex algorithms.

Moreover, due to the constraints associated with the register size of a computer, many random number generator algorithms are not able to generate random numbers with large periods without an increase in the complexity of the algorithm to the point where generation of uniformly random numbers becomes an unacceptably expensive proposition.

SUMMARY OF THE INVENTION

It is therefore an objective of the present invention to provide a method and apparatus for generating random numbers for use in electronic applications where every possible permutation is randomly obtainable.

Another objective of the present invention is to provide a method and apparatus for generating random numbers for use in electronic applications where the probability of each permutation is the same as the probability of any other permutation.

Still another objective of the present invention is to provide a method and apparatus for generating random numbers for use in electronic applications where the occurrence of one permutation does not favor or disfavor the occurrence of any other permutation.

Still another objective of the present invention is to provide a method and apparatus for generating random numbers for use in electronic applications where the random numbers generated has a large period before recycling.

Still another objective of the present invention is to provide a method and apparatus for generating random numbers for use in electronic applications where only minimal hardware is required.

Still another objective of the present invention is to provide a method and apparatus for generating random numbers for use in electronic applications where the execution speed is fast.

Still yet another objective of the present invention is to provide a method and apparatus for decoding generated random numbers for a particular application in an efficient manner.

Briefly, the present invention provides a method and apparatus for generating random numbers for use in electronic applications where, in one embodiment, a two-dimensional random number generator is constructed to include a first generator for providing a random index to a table of random permutations generated by a second generator. In the preferred embodiment, the first random number generator is a Marsaglia mother generator and the second generator is a shift register generator.

Furthermore, in the decoding of a random number into several numbers for a specific application, a modulus decoding method is disclosed for extracting numbers from a generated random number in an efficient manner.

Note that the present invention can be used in a variety of applications and devices, even though the following description pertains to game applications.

An advantage of the present invention is that it provides a method and apparatus for generating random numbers wherein every possible permutation is randomly obtainable.

Another advantage of the present invention is that it provides a method and apparatus for generating random numbers for use in electronic applications where the probability of each permutation is the same as the probability of any other permutation.

Yet another advantage of the present invention is that it provides a method and apparatus for generating random numbers where the occurrence of one permutation does not favor or disfavor the occurrence of any other permutation.

Still another advantage of the present invention is that it provides a method and apparatus for generating random numbers where the random numbers generated has a large period recycling.

Still another advantage of the present invention is that it provides a method and apparatus for generating random numbers for use in electronic applications where only minimal hardware is required.

Still another advantage of the present invention is that it provides a method and apparatus for generating random numbers for use in electronic applications where the execution speed is fast.

Still yet another advantage of the present invention is to provide a method and apparatus for decoding generated random numbers for a particular application in an efficient manner.

These and other objects and advantage of the present invention will no doubt become obvious to those of ordinary skill in the art after having read the following detailed description of the preferred embodiments.

DETAILED DESCRIPTION OF THE PREFERRED EMBODIMENTS

The preferred embodiment of a random number generator of the present invention is comprised of an array of N storage locations, a first random number generator preferably the Marsaglia mother generator, and a second random number generator preferably the shift register generator of the present invention. The size of the array can be designated arbitrarily and in the preferred embodiment the array size is 251, which is the greatest prime number less than 256 ($2^8$). The number of bits in each location of the array can be designated as well. In the preferred embodiment, each element is a 64-bit unsigned integer.

Figure 1:
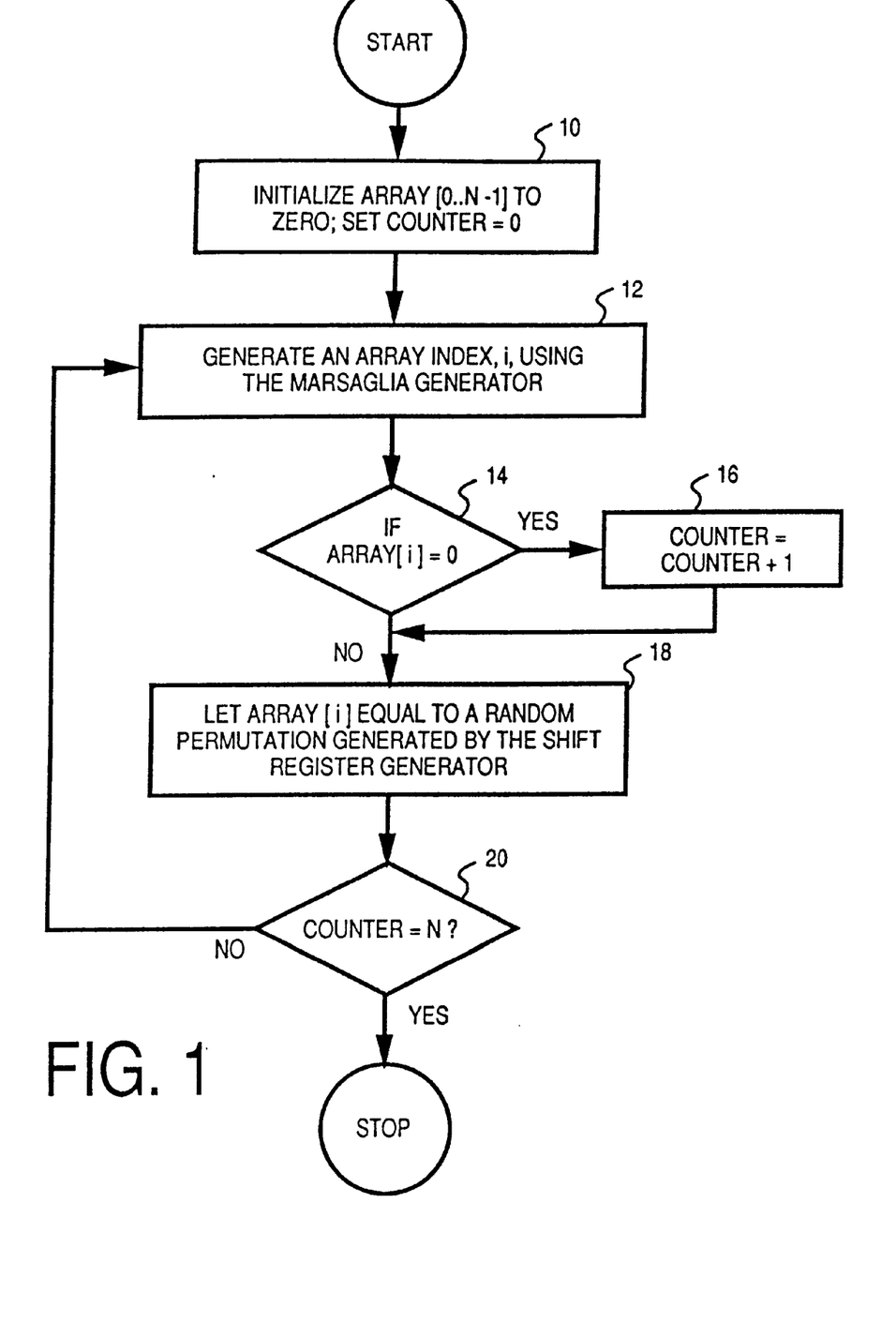
FIG. 1 is a flow chart illustrating the initialization steps for the preferred embodiment of a random number generator in accordance with the present invention.

FIG. 1 illustrates the initialization process where the array is initialized. As indicated at 10, the array is indexed from 0 to N−1 and each element of the array is set to zero. A counter, generally referred as "COUNTER", is used for counting the number of elements initialized. In the next step (12), the Marsaglia mother generator generates a random index, i, in the range from 0 to N−1, which is used as an index to the array. If the value at array location array[i] equals zero (20), COUNTER is increased by 1. In the next step, a shift register generator configured in accordance with the preferred embodiment of the invention is used to generate a j-bit random permutation for the particular application. Typically, the number of bits in the permutation equals the size of the array element (64 bits here). If the element at array[i] does not equal zero, COUNTER is not increased and the generated permutation nevertheless is placed into array [i]. Finally, if COUNTER equals N, the size of the array, all the elements of the array have been filled and the initialization process ends. If COUNTER does not equal N, there are still elements in the array with zero values and the initialization process repeats by returning to box 12 of the flow chart.

Note that there are many possible ways to initialize an array, and the preferred embodiment of the present invention is not limited to the initialization steps described above.

Figure 2A:
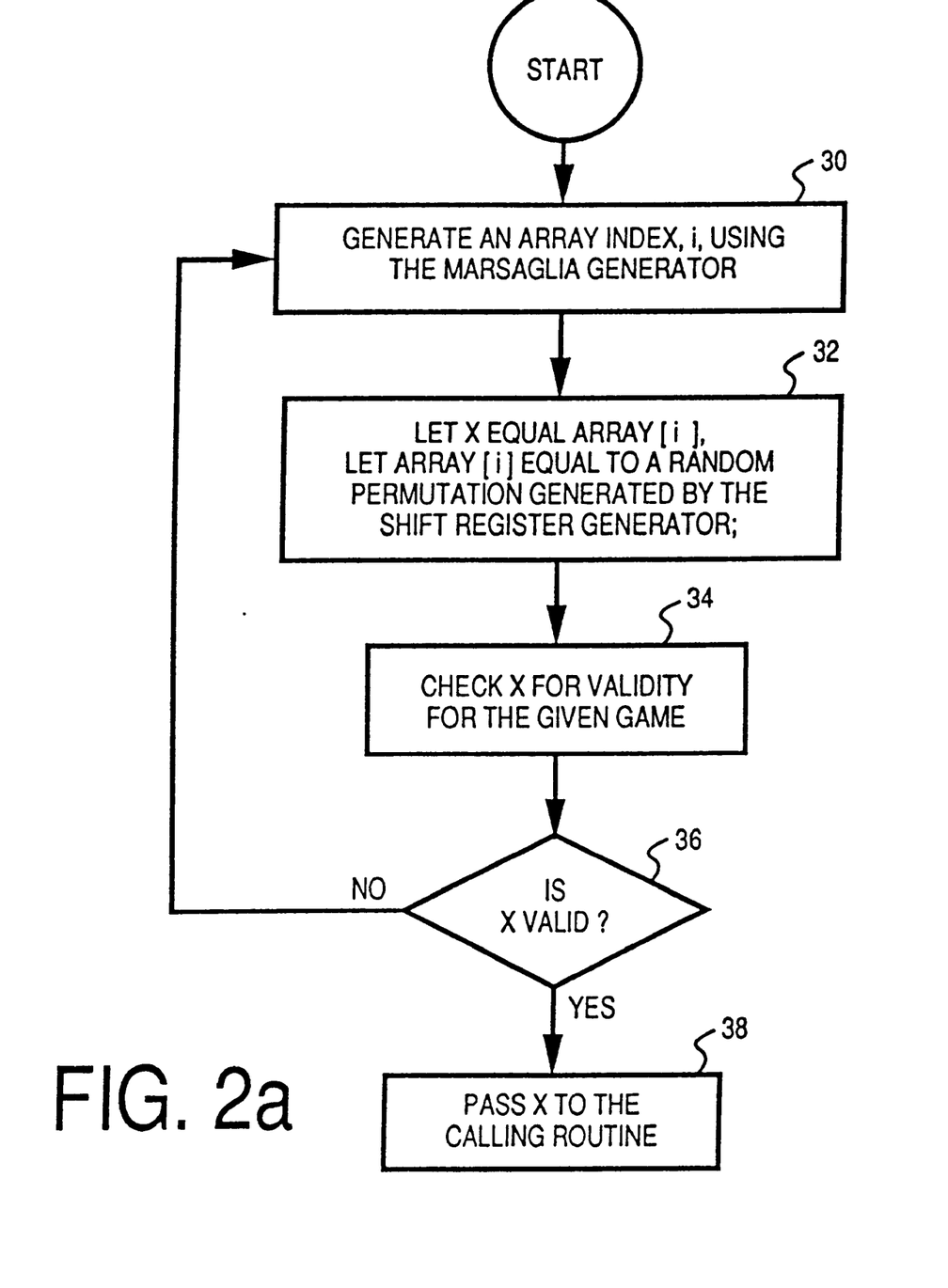
FIG. 2a is a flow chart illustrating the steps in generating and using the generated random numbers in the preferred embodiment of the present invention.

After the array has been initialized, referring to FIG. 2a, in operating the random number generator, a random permutation is selected from the array. In the first step, the Marsaglia generator is used to generate an array index, i, as indicated at box 30. A variable, "x", is set to the permutation in array [i], and a new random permutation is generated by the shift register generator and placed into array[i]. In the next step as indicated at 34, variable "x" is checked for validity. Whether "x" is valid or not depends on the application and is further explained below. If "x", is valid, "x" is returned to the calling routine and used in the particular application. If "x" is not valid, another random permutation is selected from the array and tested again. The process repeats until a valid random permutation is selected from the array.

Figure 2B:
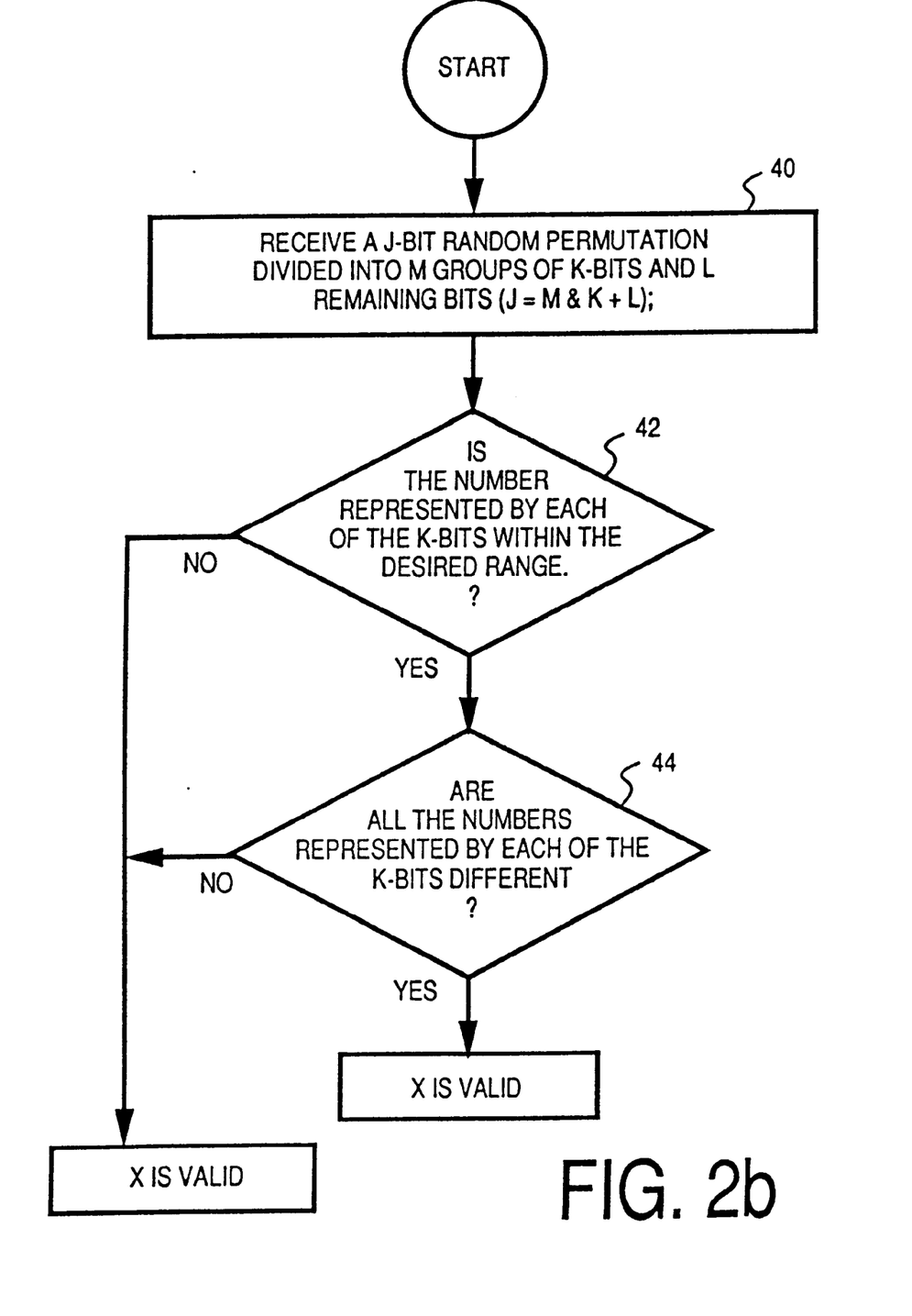
FIG. 2b illustrates the general validation steps for a game of cards.

For each particular application using the permutation represented by "x", there is a different validation process. Referring to FIG. 2b, the validation process for a game of five card draw poker is illustrated. The variable "x" is a j-bit random permutation that can be divided into m groups of k-bits, where j equals k*m+l. The variable "k" represents the number of bits required to represent a card (any card from a deck of cards having 52 cards can be represented by a value from 1 to 52 which can be represented by 6 bits), the variable "m" represents the number of cards, and the variable "l" is the number of remaining bits in the j-bit unsigned integer.

The numbers represented by each of the k-bits must be within the desired range (e.g. 1 to 52 in a 52 card deck), otherwise x is determined to be invalid. To illustrate, in a card game using a 52-card deck where 10 cards are drawn and j equals 64 bits, six-bits (which is k) are allocated for the representation of each card number for a total of 60 bits for the 10 (which is m) cards. Thus, only 60 selected bits (usually the least significant bits) are used to create the random card numbers.

Since 6 bits can represent values from 0 to 63 and there are only 52 card numbers represented by values 1 to 52, not all the bit patterns are acceptable. A bit pattern is acceptable if the value represented by a 6-bit pattern is between 1 and 52, and this is tested by decision box 42. If any of the m k-bit patterns is not within the desired range, 1 to 52 in this case, then this permutation is an invalid permutation, and x is determined to be invalid. Moreover, the random permutation is acceptable only if all the bit patterns are different (44), meaning that no two card numbers are the same. If all the bit patterns are not different, again x is invalid. Otherwise, x is determined as a valid permutation that can be used for this particular game.

In another validation example for the stop-reels type of game, commonly referred to as slot machines, there may be three stop reels having 72, 70, and 70 different symbols respectively requiring 7 bits for each stop reel. Additionally, there are 5 master combination reels activated successively where only one reel is activated at any one time. Each of the master combination reels requires 5 bits to represent twenty different symbols. Since only one master combination reels is activated at any one time, only 5 bits are needed. There is a bonus round where one of three jackpots is selected, and hence requiring 2 bits. Finally, the value of the payout from the jackpot may be stepped-controlled by 4 bits. Thus, each grouping of the bits needs to be in the specified range before x is accepted as a valid permutation. Namely, each of the 3 groups of seven bits needs to be in the range from 1 to 72, 70, and 70 respectively; the 5-bit group needs to be in the range from 1 to 20; the two-bit group needs to be in the range from 1 to 3; and the group of bits for step-control must be in the specified range as well. In this example, a total of 32 bits are used.

Note that the shift register cannot generate a value of all zero bits. To preserve a required characteristic of the random number generator (that each possible outcome occurs exactly the same number of times as any other outcome), the validation function must be designed so that, if a value of all zero bits were to occur, it would be considered invalid and discarded. For example, in a game using a deck of 52 cards, the numbers corresponding to the cards are chosen to be 1 to 52 rather than 0 to 51. If 0 to 51 had been used, then the value of all zero bits would be a valid hand, and that hand would be under-represented because the all zero bits case can not actually occur.

Note that although the Marsaglia mother generator is used in the preferred embodiment, it is not limited to such generator for generating indices.

THE MARSAGLIA "MOTHER GENERATORS"

This generator is developed by Professor Marsaglia and has been described as "the Mother of all Random Number Generators". It starts with an initial seed, X, where X equals 123456. The next seed $X_n$ is generated by the formula: $X_n=672*(X_{n-1}$ MOD $1000)+(X_{n-1}$ DIV $1000)$, where $X_{n-1}$ is the previous seed and MOD and DIV are integer operations. The random number return from the seed is simply ($X_n$ MOD 1000). For example, seed=123456

$X_n=672*456+123=306555$ returns 555

$X_{n+1}=672*555+306=373266$ returns 266

$X_{n+2}=672*266+373=179125$ returns 125

The formula can be carried out by SHIFT and logical AND operations. To illustrate, let X be a 32-bit integer and the formula can be rewritten as:

$X_n=672*(X_{n-1}\&65535)+(X_{n-1}>>16)$ and returns ($X_n\&65535$) as the random number. It has been shown that this random number generator produces a sequence of 16-bit integers with a period greater than $2^{29}$.

The period can be increased by concatenating two such generators:

$X_n=30903*(X_{n-1}\&65535)+(X_{n-1}>>16)$, $Y_n=18000*(X_{n-1}\&65535)+(X_{n-1}>>16)$, and returning $((X_n<<16)+Y_n)$. The period of this generator is greater than $2^{59}$. Note that the numbers 672, 30903, and 18000 are predetermined numbers of the Marsaglia generator.

SHIFT REGISTER GENERATOR FOR GENERATING RANDOM PERMUTATIONS

In accordance with the present invention, an algorithm is presented for generating all possible random permutations of random phenomena with the correct probabilities associated with these outcomes. This algorithm is based on the theory of primitive polynomials and shift register random bit generators. The computational complexity associated with the generation of N random permutations using this generator is O(N).

In order to simulate a random phenomenon, an algorithm must be able to generate every possible permutation where the probability of each permutation appearing is the same as the probability of any other permutation. Furthermore, the occurrence of one permutation does not favor or disfavor the occurrence of any other permutation.

The shift register random number generator of the present invention has a large periodicity to generate uniform, independent random permutations. It is based upon using the coefficients of primitive polynomials and a shift register random number generator. Although shift register random number generators are known to be autocorrelated, the present algorithm eliminates the existence of dependence or autocorrelation between neighboring uniform random numbers without reducing the long periodicity of the generator. Furthermore, the present algorithm is computationally easy to implement and one can use pseudoregisters making both the algorithm and its implementation register-size independent. Thus the present algorithm can be implemented in an eight-bit microprocessor or in a supercomputer without any change in the sequence of random numbers produced. The shift register generator here is also referred to as a full cycle generator and the value zero is not considered to be in the set of numbers.

Primitive Polynomials

Here, polynomials of a given degree n on a field $F_2=\{0, 1\}$ are considered. To illustrate, if $P_1(x)=x^3+x^2+x$ and $P_2(x)=x^4+x^2+1$, then $P_1(x)+P_2(x)=x^4+x^3+x+1$, and the vector of the coefficients of this polynomial is (1, 1, 0, 1, 1). The code sequence of 0's and 1's corresponding to the coefficients of the polynomial represents the polynomial. Some of the properties of these types of polynomials include: every polynomial is its own additive inverse; and the sum of any two polynomials is a polynomial of the same degree.

A polynomial is monic if the coefficient of the highest power of x is 1. A prime polynomial is a monic polynomial which cannot be factored into a product of lower order polynomials. The monic prime polynomials of degree 0 is P=1; of degree 1 are x and x+1; of degree 2 is $x^2+x+1$; and of degree 3 are $x^3+x+1$ and $x^3+x^2+1$. A primitive polynomial of degree $k \geq 1$ is a prime polynomial for which f(0) is not zero, and if f(x) is divisible by $x^m-1$, then $m \geq 2^k-1$. For example, the polynomial $f(x)=x^2+x+1$ is a primitive polynomial of degree k=2. It is prime because it is a monic polynomial which cannot be factored into a product of lower order polynomials. It is primitive because $f(0)<>0$ and $2^k-1=3$, where the smaller polynomial of the form $x^m-1$ divided by f(x) results in m=3 which is less than or equal to $2^k-1$. Polynomials $x^4-x-1$ and $x^{64}-x^4-x^3-x-1$ are examples of primitive polynomials of degrees 4 and 64 respectively.

Algorithm for Shift Resister Generator

A way of generating random bits is to start with a bit pattern of desired size and use the following algorithm described using Intel 8086 assembly language instructions:

|        | mov ax, x ; | the unsigned number x is moved to register ax |
|--------|-------------|-----------------------------------------------|
|        | shl ax, 1 ; | shift register ax left one bit |
|        | jno over ;  | jump if high bit was originally zero |
|        | xor a       | a's binary digits are coefficients of a primitive polynomial |
| over:  | mov x, ax   |                                               |

The constant "a" represents the coefficients of the selected primitive polynomial. To illustrate the operation of this algorithm, consider a four bit binary number 1010 which is used as the seed. The polynomial $x^4-x-1$ is a fourth degree primitive polynomial, which has a vector of binary digits (1, 0, 0, 1, 1). Ignoring the high order bit, the binary number formed by the bits above is 0011. In executing the algorithm above, the sequence of numbers generated by the algorithm is: 1010, 0111, 1110, 1111, 1101, 1001, 0001, 0010, 0100, 1000, 0011, 0110, 1100, 1011, 0101, and etc. The sequence of random bits generated by the above algorithm is 010111100010011. From the above sequence of random bits, one could generate the following sequence of four bit binary numbers: 0101, 1011, 0111, 1111, 1110, 1100, 1000, 0001, 0010, 0100, 1001, 0011. Note that the generation of these random numbers is extremely fast because the shift and logical-and operations are extremely fast for all computer architectures.

Figure 3:
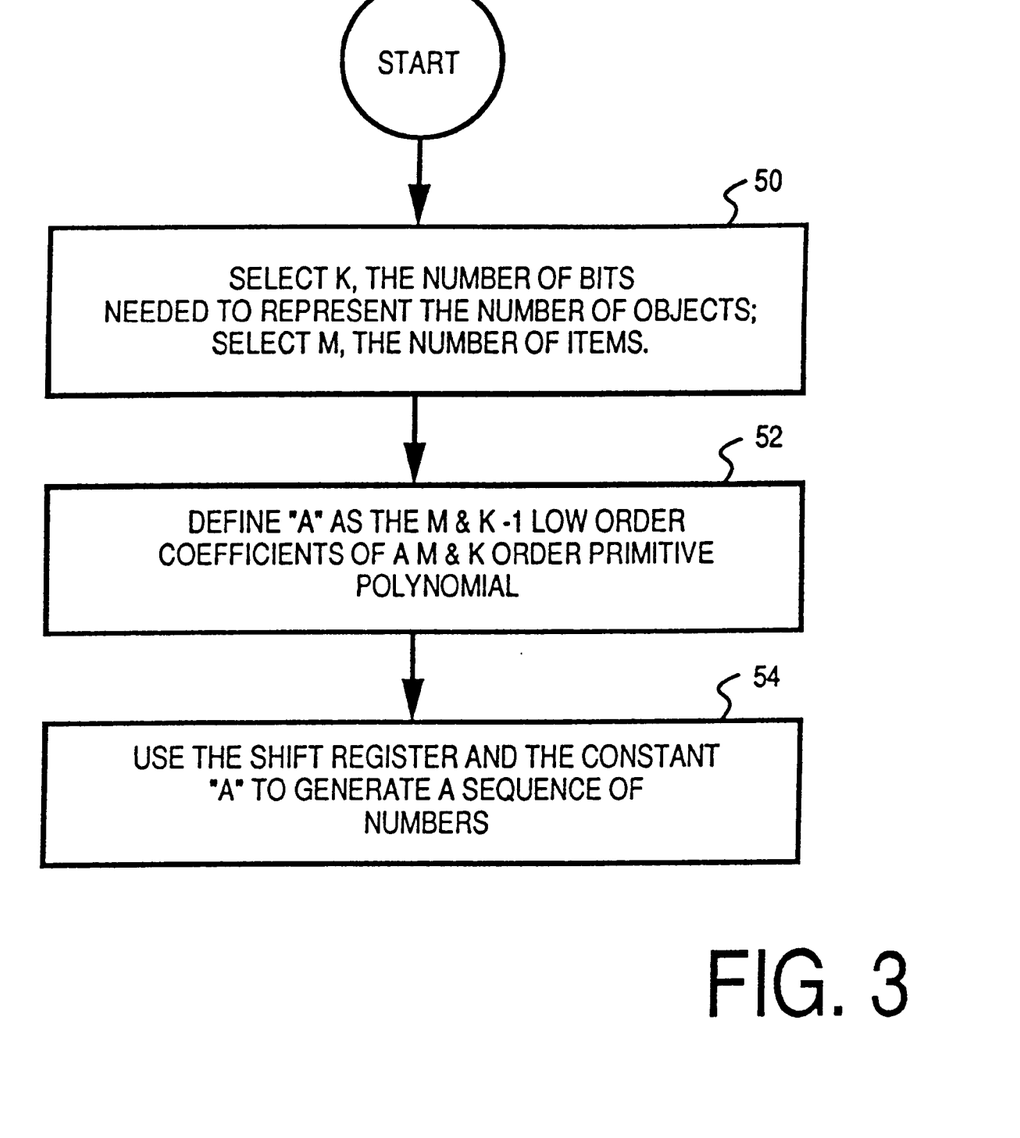
FIG. 3 is a flow chart showing the steps for generating random numbers by the shift-register generator of the present invention.

Referring to FIG. 3, the shift register generator of the present invention for generating at random all the permutations of n things chosen m at a time is described by the flow chart. First, the smallest number of bits k required to represent the number n and the number of items, m, are selected (50). For example, in a game of poker using a deck of cards and dealing 5 cards, n equals 52, m equals 5, and k is the number of bits needed to represent 52. Next, a primitive polynomial of degree "n", where n is at least m*k, is looked-up, and a constant "a" is defined as the binary number whose bits correspond to the n low order coefficients of that primitive polynomial of degree n (52). Using the shift register described above and the constant "a", a sequence of m*k (or more) bits are generated (54). Note that a m*k degree primitive polynomial has (m*k)+1 coefficients. In the preferred embodiment, the low order m*k coefficients are used.

Figure 4:
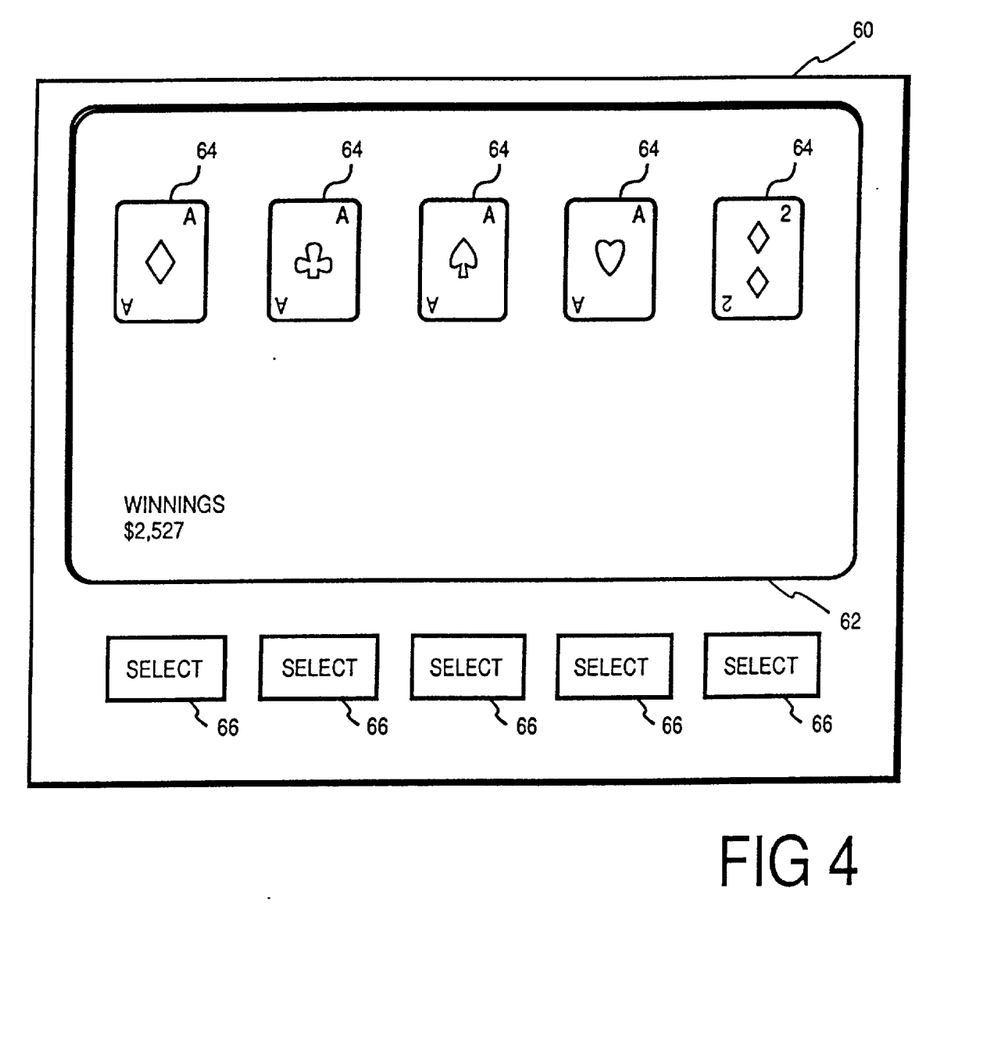
FIG. 4 is an illustration of a display of a game apparatus using an embodiment of the present invention.

Referring to FIG. 4, an application of an embodiment of the present invention is illustrated as part of a gaming apparatus 60. The apparatus includes a monitor 62 showing game information and five cards 64. The cards are generated by corresponding random numbers generated by the generator of the present invention. The display also includes a number of buttons 66 for user input.

Figure 5:
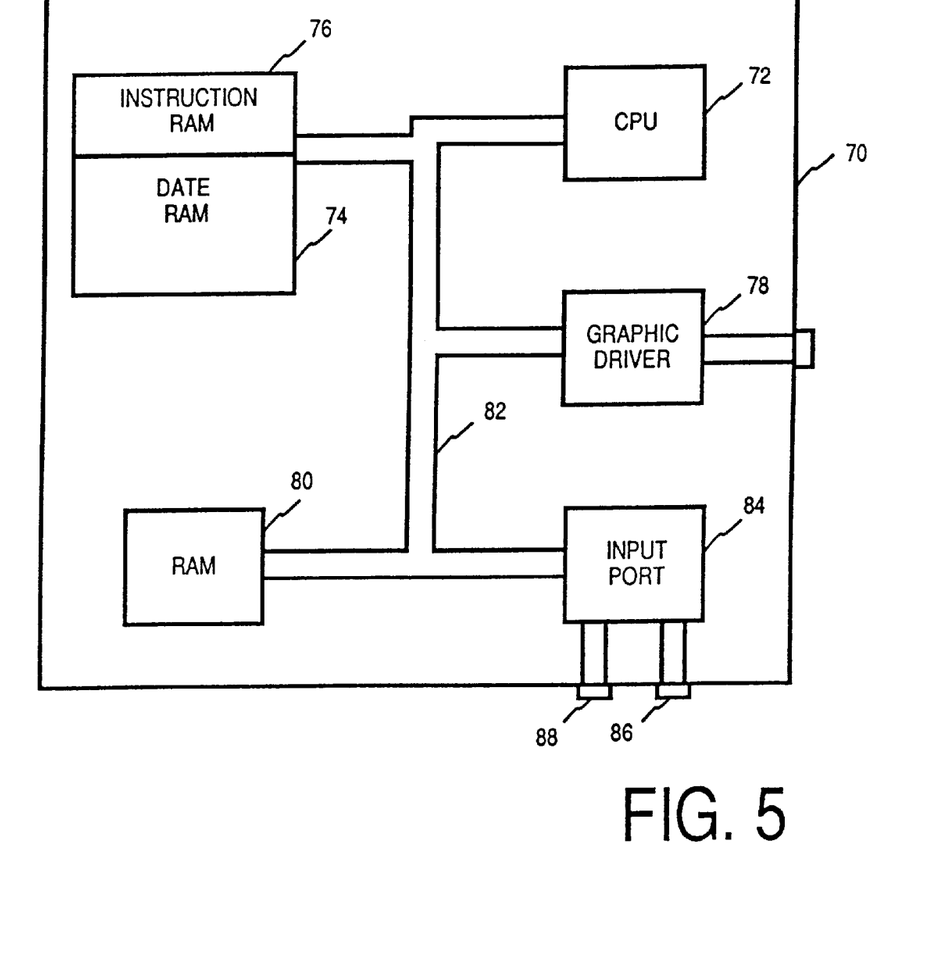
FIG. 5 is an illustration of the hardware for an embodiment of the present invention.

FIG. 5 illustrates a hardware embodiment of the present invention in the form of a control board 70. The board includes a processor 72 such as an Intel 8088, RAM memory for storing instructions 76 as well as data 74, ROM memory 80 for storing preprogrammed data and/or instructions, a display driver 78 for driving a monitor, a bus 82 providing a communication pathway among the components, and a bus interface 84 for interacting with external inputs from the user 88 and from a programmer 86.

DETAILED DESCRIPTION OF AN ALTERNATE EMBODIMENT

The above described random number generator exhibits the proper characteristics in all statistical tests and, more importantly, performs properly in a probabilistic sense. However, in decoding the random numbers generated by the above-described random number generator for application to a particular game, the fixed-field decoding method described above necessarily tests and discards several random numbers before one is found to be valid, wasting a significant number of the generated random numbers and processing time.

When evaluating random number generators, emphasis is usually placed on a random number generator producing the correct statistical behavior. A series of statistical tests (such as permutation, chi square and autocorrelation) can demonstrate whether, when measured over a large sample, a random number generator produces behavior that matches that of truly random numbers. A statistically good random number generator can be used accurately in simulations as long as the importance of any one event in a simulation is roughly the same as the importance of any other event.

In the gaming contest, jackpots paid by a 3 reel slot machine can vary from a single coin paid out to many millions of coins paid out. If the random number generator is statistically correct, the jackpot will occur, on the average, at the proper frequency. If suppose that the random number generator actually causes the jackpot to be paid one time too often where the random number generator has chosen a particular random number one time too frequently, which, statistically speaking, does not significantly change the statistics of the random number generator, this one time too many occurrence may cause a multi-million dollar jackpot to be paid out once too often, significantly affecting the expected payout of the game.

The possibility of a problem exists because statistical testing doesn't take into account the wide variation in the significance of possible events. A statistically correct random number generator can generate a statistically correct sequence of random numbers that can cause a simulation to deviate dramatically from the expected behavior. To avoid such problem, it is argued that, in addition to being statistically accurate, a random number generator used for gaming purposes should also be probabilistically accurate, which simply means that the random number generator produces each possible outcome exactly the correct number of times. The difference between statistical and probabilistic will now be considered.

A random number generator generates a repeating sequence of random numbers, where the sequence is called the cycle of the random number generator. A good random number generator will have a very large cycle. The above described random number generator, for example, has a cycle of about $2^{64}$, which means that it will produce that many unique random bit patterns before repeating. This cycle is fairly large such that, practically speaking, the random number generator will never cycle in the life of a machine.

In studying of a random number generator statistically, a relatively short sequence of the generated numbers is compared to the cycle of the random number generator. After all, it is not possible to study the entire sequence, because such a computation would take thousands of years to complete. Therefore, statistical tests evaluate a random number generator based on a sampling of the generated random numbers.

In studying a random number generator probabilistically, the entire sequence of numbers is studied. Of course, time cannot be afforded to generate and look at each number, but mathematical arguments can be made about the nature of the random number generator. For example, it is easy to show that, in an entire cycle, the random number generator will produce each possible outcome in any game exactly the same number of times as any other outcome. If the game is poker, for example, exactly the same number of royal flushes will occur as will the number of any other specific hand. Therefore, we can be assured that no particular jackpot will be overpaid (or underpaid) even though the random number generator cannot be exhaustively and statistically tested.

The above described embodiment presented a random number generator, which, by construction, is both statistically and probabilistically accurate.

Fixed Field Decoding

In the above described embodiment, the random number generator returns a 64-bit number, which cannot be used to represent the dealt hand for a particular game. First, the 64-bit number must be decoded into values that represent an outcome (which is a series of cards constituting a hand). This decoding process must be tailored for each type of proposition (or game). For example, for 5-card draw poker (which requires up to 10 cards), the 64-bit number is decoded into 10 6-bit fields with 4 bits unused. Each 6-bit can represent a number in the 0..63 range. If each value is in the 1..52 range and there are no duplicates, the 64-bit random number is then a valid number which can be successfully decoded into a 10-card hand. If the 64-bit value cannot be decoded due to the fact that there are one or more 6-bit numbers outside the 1..52 range or there are duplicative numbers, the 64-bit number is then discarded. In this decoding method, on the average, approximately 19 64-bit numbers must be considered before a valid one is found for the game, discarding approximately 18 64-bit numbers in the process.

There is another concern with fixed field decoding. The above described embodiment does not generate the value 0, so the decoding must be constructed so that the value 0 would be discarded anyway. Otherwise, the probabilistic accuracy of the random number generator would be compromised due to the fact that the corresponding value that the value 0 encodes would occur one time less than the other outcomes.

It is simple to implement a decoding scheme to remove the value 0 from the set of possible values by ensuring that any value required is in the range 1..N rather than the range 0..(N−1). Then, using the above example, a 6-bit number having the value 0 would be considered as an invalid number causing the entire 64-bit number to be discarded as an invalid number. This approach causes more bits to be used than would otherwise. For example, if values in the range 1..4 are needed, 3 bits would be required (rather than two bits) to avoid the 0 case.

Modulus Decoding

In an alternate embodiment of the present invention, a different way to decode the 64-bit number returned by the random number generator is disclosed. Considering the same five-card draw poker game, the entire proposition is composed of numbers in the range 1..52, 1..51, 1..50, . . . , 1..43 for a total of 10 cards where a number is generated from each of the above ranges to represent one of the ten cards for the hand. Therefore, a 64-bit number can be decoded as follows, where x is the given 64-bit random number, q is the quotient from the previous iteration, and r is the remainder from the previous iteration:

(q,r)=divide(x, 52)/first r decodes to the first card
(q,r)=divide(q, 51)/second r decodes to the second card
*
*
*
(q,r)=divide(q, 43)/tenth r decodes to the tenth card Modulus decoding can be used to decode the 64-bit number into any proposition as long as the product of the ranges of numbers needed for a proposition is smaller than $2^{64}$. In the case of 5-card draw poker taking 10 cards, the product of 52 51 50 . . . 43 is approximately $2^{55.7}$ and therefore uses less than 56 bits. Thus, a 64-bit number can easily be used to accommodate this game.

Figure 6A:
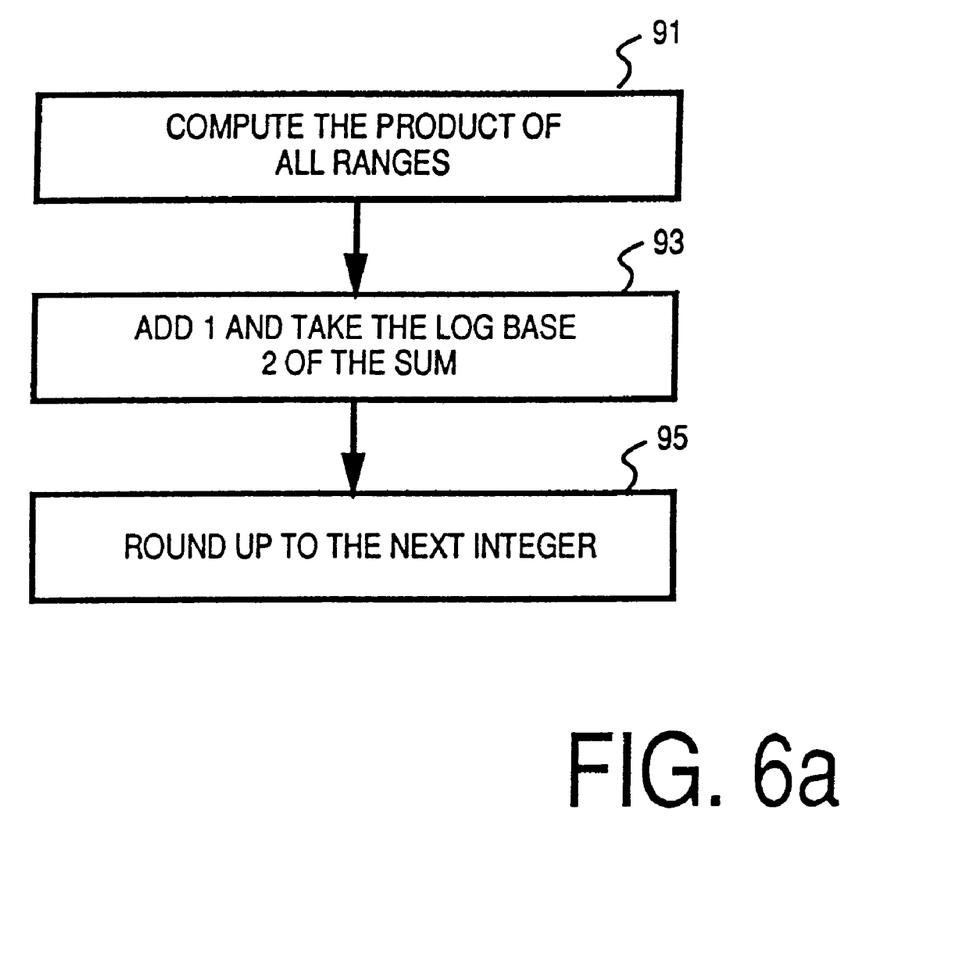
FIG. 6a is a flow chart illustrating the steps in determining the number of bits required for the modulus decoding process.

In using this decoding method, the first step is determine the number of bits required for the particular game, which is illustrated by FIG. 6a. Then, the decoding steps are carried out, which is illustrated by FIG. 6b.

Referring to FIG. 6a, in determining the number of bits required for a particular game, the first substep is to compute the product of all the ranges 91. For five card draw poker requiring ten cards for the game, the product of the ranges would equal to 52*51*50*49*48*47*46*45*44*43, or 5.74E16. Similarly, for a dice-tossing game where the dice is tossed 3 times, the product of all the ranges would be 6*6*6, or 216. In the next substep 93, one is added to the product of all the ranges, and base 2 logarithm is taken over this sum. Finally, in the last substep 95, the result obtained from the log operation is rounded up to the next integer, which is the number of bits required and used for modulus decoding. This algorithm can be expressed mathematically as:

number of bits=$\lceil \log_2 [(\Pi_i\, r_i)+1] \rceil$, where each $r_i$ represents a range value. For the five card draw (drawing ten cards) example above, the number of bits required for modulus decoding as determined by the formula would be 56. Similarly, the number of bits for the dice-tossing game is 8. After the number of bits is determined for a particular game, the bits are taken from the given random bit pattern and used for modulus decoding as described below.

Figure 6B:
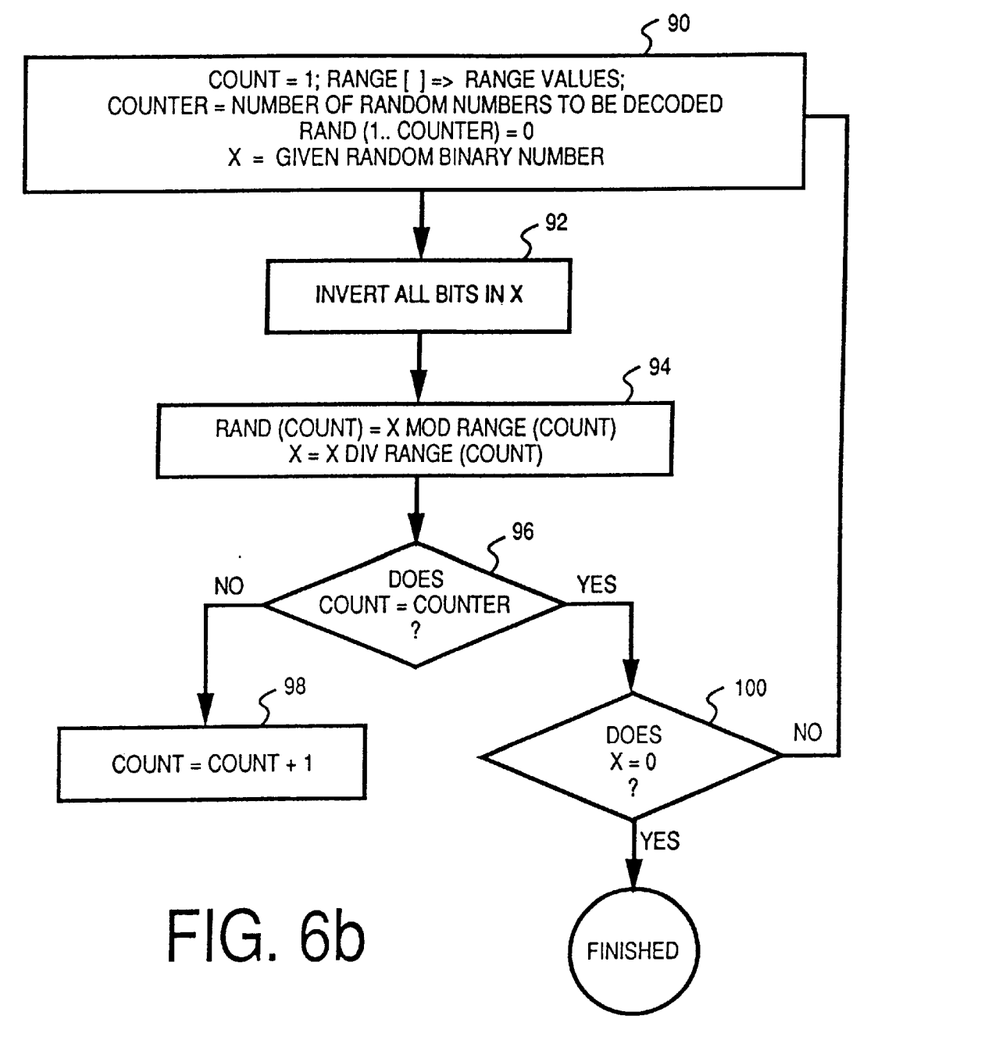
FIG. 6b is a flow chart illustrating the modulus decoding process.

FIG. 6b illustrates the modulus decoding processing steps. First, referring to box 90, a number of variables are initialized. COUNT is a counter used to count the number of random numbers decoded and is initialized to 1; RANGE is an array with elements initialized to the desired range values (for five-card draw poker drawing 10 cards, the RANGE array would be initialized to 52, 51, 50, 49, 48, 47, 46, 45, 44, and 43); COUNTER is the number of random numbers to decode (which would be 10 in the five-card draw poker game); X is the given random number having predetermined number of bits; and RAND() is an array for storing the decoded random numbers. After initialization, all of the bits in the giving random number X are inverted which is an 1's complement operation 92. In the next step as shown at box 94, a random number is decoded by taking the reminder value generated from the operation X MOD RANGE [COUNT], and the X is reduced to the value generated from the operation X DIV RANGE[COUNT]. If not all of the random numbers have been decoded (decision box 96), COUNT is incremented by 1 and the process flow returns to box 94. If all of the random numbers have been decoded (decision box 96) and if X equals zero (maintaining probability accuracy as explained below), the decoding process has been successfully completed. If X does not equal to zero, probabilistic accuracy is not maintained, and the decoded random numbers are discarded. Another random number is obtained from the random number generator, and the process repeats from box 90.

There are two concerns when using modulus decoding. First, the probabilistic accuracy of the random outcomes has to be maintained. The fixed field decoding method always leaves an integral number k of unused bits behind, which means that, in a cycle, each outcome will occur exactly $2^k$ times, which maintains probabilistic correctness. Modulus decoding, on the other hand does not leave behind an integral number of unused bits. Consider the example of choosing 2 cards from a deck of 3 cards (with symbols A, B, and C). There are 6 possible ways (i.e. AB, BA, AC, CA, BC, and CB) to choose the 2 cards, so a 3-bit pattern is generated to select the possible outcomes. However, 3 bits will decode into 8 possible outcomes, which means that two of the outcomes are represented twice, while the remaining 4 outcomes are represented only 1 time. Thus, probabilistic accuracy is violated.

To insure probabilistic accuracy, further refinement is necessary to decode the given random binary number. Probabilistic accuracy can be maintained by checking the quotient, q, generated from the final DIV operation when decoding has been completed. If q equals 0, probabilistic accuracy has been maintained and the result is acceptable. Otherwise, the 64-bit random number is discarded. On the average, less than one 64-bit candidate random number is discarded for every 64-bit random number selected. Table 1 lists all the possible outcomes for drawing two cards from a three card deck.

TABLE 1

| Row | Bit Pattern | Card1 mod3/ div3 | Card2 mod2/ div2 | Cards Decoded |
|---|---|---|---|---|
| 0 | 0 0 0 | 0, 0 | 0, 0 | A B |
| 1 | 0 0 1 | 1, 0 | 0, 0 | B A |
| 2 | 0 1 0 | 2, 0 | 0, 0 | C A |
| 3 | 0 1 1 | 0, 1 | 1, 0 | A C |
| 4 | 1 0 0 | 1, 1 | 1, 0 | B C |
| 5 | 1 0 1 | 2, 1 | 1, 0 | C B |
| 6 | 1 1 0 | 0, 2 | 0, 1 | A B |
| 7 | 1 1 1 | 1, 2 | 0, 1 | B A |

The first column is the row index column for reference only. The second column is the initial random number bit pattern. The third column lists the results of the mod 3 and div 3 operations. The fourth column lists the results of the mod 2 and div 2 operations. The fifth column lists the corresponding decoded results from the modulus decoding operation, noting that the first card corresponds to the result from the mod 3 operation and the second card corresponds to the result from the mod 2 operation. In corresponding a generated random number to a card, the cards are first labeled as 0, 1, and 2 to correspond to A, B, and C. When a card has been selected from the deck, lets say the B card has been selected, the remaining two cards are labeled 0 and 1 to correspond to A and C. In this manner, the generated random numbers are corresponded to the cards.

Also note that the results of rows 0 and 6 are the same so is that of rows 1 and 7. Under the modulus decoding method of the present invention, if the given bit pattern is such that the quotient from the last DIV operation is not zero (such as in rows 6 and 7), the results generated from the given bit pattern are invalid and are discarded. Another random number is fetched and decoded again. In Table 1, the results from the other rows are fine and are kept, noting that the results of the last DIV operation are zeros.

The second concern in dealing with modulus decoding is the same as with fixed field decoding, that the random number generator never generates the value 0. Therefore, we must ensure that the value 0 is always discarded. This problem is handled by inverting (1's complement operation) the 3-bit candidate before decoding. After inverting, the bit pattern that is not used is the bit pattern having all 1's. The modulus decoding constraint just discussed will never use that last value unless exactly $2^3$ (in this example) possible outcomes are needed which is a case not allowed under the designed scheme. Table 2 lists the results of modulus decoding where one's complement of the random number bit patterns are used.

TABLE 2

| ROW | 1's compl. Bit Pattern | Card1 mod3/ div3 | Card2 mod2/ div2 | Cards Decoded |
|---|---|---|---|---|
| 0 | 1 1 1 | 1, 2 | 0, 1 | B A |
| 1 | 1 1 0 | 0, 2 | 0, 1 | A B |
| 2 | 1 0 1 | 2, 1 | 1, 0 | C B |
| 3 | 1 0 0 | 1, 1 | 1, 0 | B C |
| 4 | 0 1 1 | 0, 1 | 1, 0 | A C |
| 5 | 0 1 0 | 2, 0 | 0, 0 | C A |
| 6 | 0 0 1 | 1, 0 | 0, 0 | B A |
| 7 | 0 0 0 | 0, 0 | 0, 0 | A B |

Again, rows 0 and 1 are invalid and discarded if generated.

The modulus decoding method can be modified for a variety of games. For example, the game Fort Knox requires values for 3 reels, 1 bonus combination, 1 pedestal choice, and 1 bonus payout. Therefore, it requires 6 values to be decoded from the given random number. Typically, there are 72 stops on the first and third reels and 70 stops on the second reel. There are 20 possible stops for the bonus combination reel. There are 3 possible pedestal values. The bonus payout needs a value in 1 to 6 range to decide which bonus to pay. The number of bits required for this game is 27, which is calculated from the formula ceil(log2 [(72*70*72*20*3*6)+1]). The mod/div operations would use the range values 72, 70, 72, 20, 3, and 6 in that order. If the result from the last div operation equals zero, the generated random numbers from the modulus decoding operations are then valid.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

What I claim is:

1. A method for generating random numbers, comprising the steps of:
   a. providing an array of storage elements wherein each of the storage elements is uniquely indexed and accessible;
   b. initializing said array of storage elements by storing a sequence of random binary numbers in each of the storage elements;
   c. using a second random number generator to generate a second random number corresponding to an index to a particular storage element of said array;
   d. using a first random number generator to generate a first sequence of random binary numbers;
   e. extracting the sequence of random binary numbers stored in said particular storage element;
   f. storing said first sequence of random binary number in said particular storage element;
   g. outputting said extracted sequence of random binary numbers;
   h. modulus decoding a plurality of random numbers from said extracted sequence of random binary numbers for a particular application by
      1) determining a master random number by selecting a particular number of bits from said extracted sequence of random binary numbers;
      2) defining one or more range values corresponding to the upper limit values of said plurality of random numbers;
      3) selecting a range value from said one or more range values;
      4) dividing said master random number by said selected range value to generate a quotient and a remainder;
      5) saving the remainder as a decoded random number;
      6) changing the value of said master random number to the value of said quotient; and
      7) repeating steps 3)–6) until all of said random numbers are generated, and
   i. repeating from step "c." if said decoded plurality of random numbers are invalid.

2. A method as recited in claim 1 wherein said first generator is a shift-register random number generator.

3. A method as recited in claim 2 wherein said shift-register random number generator generates random binary numbers as a function of the coefficients of a primitive polynomial.

4. A method as recited in claim 1 wherein the size of said array is a prime number other than 1.

5. A method as recited in claim 1 wherein said second generator is a Marsaglia mother random number generator.

6. A method as recited in claim 1 further including the sub-step of:
   8) if the value of the quotient from the last dividing step does not equal zero, said decoded random numbers are not valid and are discarded.

7. A method as recited in claim 1 wherein the particular number of bits required for generating said plurality of random numbers equals to the rounded-up integer of the value from the base-2 logarithm of the product of said range values plus 1.

8. A method as recited in claim 1 wherein in said determining step the bits for said master random number is selected from the one's complement of said extracted sequence of random binary numbers.

9. A method as recited in claim 1 wherein said method is a method for generating a plurality of random and different numbers corresponding to objects from a set of available objects in a game of chance where payments to wagers are made in accordance with the probability of the occurrence of the combination of objects generated from said plurality of random and different numbers.

10. An apparatus for generating random numbers in accordance with a first parameter defining the number of random numbers to be generated and one or more second parameters each defining the range of a random number to be generated, comprising:
   input means for receiving said first parameter and said second parameter;
   storage means having a plurality of indexable storage elements for storing a plurality of sequences of random binary numbers;
   processor means operatively connected to said input means and said storage means for generating a plurality of sequences of random binary numbers and storing said plurality of sequences of random binary numbers in said storage means, said processor means generating another sequence of random binary numbers and an index to a storage element in said storage means, extracting the sequence of random binary numbers stored in the indexed storage element, storing the generated sequence of random binary numbers in the indexed storage element, and modulus decoding a plurality of random numbers from said extracted sequence of random binary numbers in accordance with said first parameter and said second parameters, by
   1) determining a master random number by selecting a particular number of bits from said extracted sequence of random binary numbers,
   2) selecting a range value from said one or more of said second parameters;
   3) dividing said master random number by said selected range value to generate a quotient and a remainder;
   4) saving the remainder as a decoded random number;
   5) changing the value of said master random number to the value of said quotient; and
   6) repeating steps 2)–5) until all of said random numbers are generated;
   where each decoded random number corresponds to an object in a predefined set of objects; and
   display means operatively connected to said processor means for displaying objects corresponding to said plurality of decoded random numbers.

11. An apparatus as recited in claim 10 wherein a shift-register random number generator generates the sequences of random binary numbers.

12. An apparatus as recited in claim 10 wherein said shift-register random number generator generates the sequences of random binary numbers as a function of the coefficients of a selected primitive polynomial.

13. An apparatus as recited in claim 10 wherein a Marsaglia random number generator generates the index to the storage elements.

14. An apparatus as recited in claim 10 further including the step of:
   7) if the value of the quotient from the last dividing step does not equal zero, said decoded random numbers are not valid and are discarded.

15. An apparatus as recited in claim 10 wherein the particular number of bits required for generating said plurality of random numbers equals to the rounded-up integer of the value from the base-2 logarithm of the product of said range values plus 1.

16. An apparatus as recited in claim 10 wherein in said determining step the bits for said master random number is selected from the one's complement of said extracted sequence of random binary numbers.

17. An apparatus as recited in claim 10 wherein said apparatus is an apparatus for generating a plurality of random and different numbers corresponding to objects from a set of available objects in a game of chance where payments to wagers are made in accordance with the probability of the occurrence of the combination of objects generated from said plurality of random and different numbers.

18. A modulus decoding method for generating a plurality of random numbers from a given sequence of random binary numbers, comprising the steps of:
   1) determining a master random number by selecting a particular number of bits from said given sequence of random binary numbers;
   2) defining one or more range values corresponding to the upper limit values of said plurality of random numbers;
   3) selecting a range value from said one or more range values;
   4) dividing said master random number by said selected range value to generate a quotient and a remainder;
   5) saving the remainder as a decoded random number;
   6) changing the value of said master random number to the value of said quotient; and
   7) repeating steps 3)–6) until all of said random numbers are generated.

19. A method as recited in claim 18 further including the sub-step of:
   8) if the value of the quotient from the last dividing step does not equal zero, said decoded random numbers are not valid and are discarded.

20. A method as recited in claim 18 wherein the number of bits required for generating said plurality of random numbers equals to the rounded-up integer of the value from the base-2 logarithm of the product of said range values plus 1.

21. A method as recited in claim 18 wherein in said determining step the bits for said master random number is selected from the one's complement of said extracted sequence of random binary numbers.

22. A method as recited in claim 18 wherein said method is a method for generating a plurality of random and different numbers corresponding to objects from a set of available objects in a game of chance where payments to wagers are made in accordance with the probability of the occurrence of the combination of objects generated from said plurality of random and different numbers.

23. A decoder for decoding a plurality of random numbers from a given sequence of random binary numbers, comprising:

1) means for determining a master random number by selecting a particular number of bits from said given sequence of random binary numbers;
2) means for receiving as input one or more range values corresponding to the upper limit values of said plurality of random numbers;
3) means for selecting a range value from said one or more range values;
4) means for dividing said master random number by said selected range value to generate a quotient and a remainder;
5) means for saving the remainder as a decoded random number;
6) means for changing the value of said master random number to the value of said quotient; and
7) means for activating said selecting means, said dividing means, said saving means, and said changing means to repeatedly generating random numbers until all of said random numbers has been generated.

24. A decoder as recited in claim 23 further including:

8) means for testing and discarding said decoded random numbers if the value of the last quotient does not equal zero.

25. A decoder as recited in claim 23 wherein the number of bits required for generating said plurality of random numbers equals to the rounded-up integer of the value from the base-2 logarithm of the product of said range values plus 1.

26. A decoder as recited in claim 23 wherein the bits for said master random number is selected from the one's complement of said given sequence of random binary numbers.

27. A decoder as recited in claim 23 wherein said decoder is a decoder for generating a plurality of random and different numbers corresponding to objects from a set of available objects in a game of chance where payments to wagers are made in accordance with the probability of the occurrence of the combination of objects generated from said plurality of random and different numbers.

* * * * *

UNITED STATES PATENT AND TRADEMARK OFFICE
CERTIFICATE OF CORRECTION

PATENT NO. : 6,193,607 B1  Page 1 of 1
DATED : February 27, 2001
INVENTOR(S) : Timothy L. Kay et al.

It is certified that error appears in the above-identified patent and that said Letters Patent is hereby corrected as shown below:

<u>Title page,</u>
Delete Item [63], "Related U.S. Application Data
  Continuation-in-part of application No. 08/665,699, filed
  on Jun. 18, 1996, now Pat. No. 5,871,400."

<u>Column 1,</u>
Lines 4-8, delete "This application is a Continuation-in-Part of application Ser. No. 08/665,699, filed Jun. 18, 1996, entitled "Random Number Generator for Electronic Applications, now U.S. Pat. No. 5,871,400."

Signed and Sealed this

Sixth Day of August, 2002

Attest:

JAMES E. ROGAN
Attesting Officer  Director of the United States Patent and Trademark Office